US008899035B2

(12) United States Patent
Nishikawa et al.

(10) Patent No.: US 8,899,035 B2
(45) Date of Patent: Dec. 2, 2014

(54) HYDRAULIC CONTROL APPARATUS FOR WORK MACHINE

(75) Inventors: Hiroyasu Nishikawa, Tokyo (JP); Seiichi Akiyama, Tokyo (JP); Yusuke Shimizu, Tokyo (JP); Atsunobu Doi, Tokyo (JP); Sei Shimahara, Tokyo (JP); Manabu Nakanishi, Kobe (JP); Masashi Shibata, Kobe (JP)

(73) Assignee: Caterpillar SARL, Geneva (CH)

( * ) Notice: Subject to any disclaimer, the term of this patent is extended or adjusted under 35 U.S.C. 154(b) by 516 days.

(21) Appl. No.: 13/265,750

(22) PCT Filed: Aug. 17, 2010

(86) PCT No.: PCT/JP2010/063870
§ 371 (c)(1), (2), (4) Date: Oct. 21, 2011

(87) PCT Pub. No.: WO2011/027668
PCT Pub. Date: Mar. 10, 2011

(65) Prior Publication Data
US 2012/0036845 A1 Feb. 16, 2012

(30) Foreign Application Priority Data
Sep. 4, 2009 (JP) ................................ 2009-204340

(51) Int. Cl.
*F16D 31/02* (2006.01)
*E02F 9/22* (2006.01)
*F15B 11/042* (2006.01)

(52) U.S. Cl.
CPC ........... *E02F 9/2235* (2013.01); *F15B 2211/45* (2013.01); *E02F 9/2296* (2013.01); *F15B 2211/255* (2013.01); *F15B 2211/3116* (2013.01); *F15B 2211/88* (2013.01); *F15B 2211/6316* (2013.01); *F15B 2211/6652* (2013.01); *E02F 9/2282* (2013.01); *F15B 2211/20553* (2013.01); *F15B 2211/20523* (2013.01); *F15B 2211/85* (2013.01); *F15B 2211/6654* (2013.01); *F15B 11/0423* (2013.01); *F15B 2211/633* (2013.01); *E02F 9/2285* (2013.01)
USPC .............................................. 60/452; 60/445

(58) Field of Classification Search
USPC .................... 60/399, 443, 444, 445, 447, 452
See application file for complete search history.

(56) References Cited

U.S. PATENT DOCUMENTS 5,421,155 A 6/1995 Hirata et al.
5,758,499 A * 6/1998 Sugiyama et al. .............. 60/452
6,526,747 B2 * 3/2003 Nakatani et al. ................ 60/399

FOREIGN PATENT DOCUMENTS

JP 63-88303 A 4/1988
JP 4-130361 U 11/1992

(Continued)

OTHER PUBLICATIONS

European Search Report mailed Jul. 18, 2013 for corresponding European Patent Application No. 10813619.3.

*Primary Examiner* — Michael Leslie
(74) *Attorney, Agent, or Firm* — Birch, Stewart, Kolasch & Birch, LLP

(57) ABSTRACT

A hydraulic pump driven by an engine, a hydraulic actuator, and a negative control circuit are provided on an open center hydraulic circuit, for guiding the hydraulic pressure in the center bypass to the hydraulic pump, as a negative control pressure. A negative control pressure control device controls the negative control pressure to an arbitrary value is also provided. The pump characteristic of the hydraulic pump is set such that the discharge flow rate is minimized when the negative control pressure in the negative control circuit is equal to or greater than a first predetermined pressure. Furthermore, an idling detection device that detects whether the hydraulic actuator is in a non-operated state or not is provided. The negative control pressure is forcefully controlled to the first predetermined pressure or higher when the non-operating state is detected.

6 Claims, 2 Drawing Sheets

(56) References Cited

FOREIGN PATENT DOCUMENTS

| | | | |
|---|---|---|---|
| JP | 7-13605 | A | 1/1995 |
| JP | 2001-271806 | A | 10/2001 |
| JP | 2003-184810 | A | 7/2003 |
| JP | 2003-293400 | A | 10/2003 |
| JP | 2004-116347 | A | 4/2004 |
| JP | 2007-70913 | A | 3/2007 |
| JP | 2009-121586 | A | 6/2009 |

* cited by examiner

HYDRAULIC CONTROL APPARATUS FOR WORK MACHINE

TECHNICAL FIELD

The present invention relates to a hydraulic control apparatus for a work machine which controls the discharge flow rate from a hydraulic pump by means of a negative control pressure in a center bypass in an open center hydraulic circuit.

BACKGROUND ART

In conventional work machines, e.g., hydraulic excavators and wheel loaders, provided with an open center hydraulic circuit, the discharge flow rate from a hydraulic pump is controlled by means of the working hydraulic pressure in a center bypass. For example, Patent Reference 1 discloses a hydraulic circuit structure having an orifice (choke) provided in a center bypass, in which a negative control passage led from the upstream side of the orifice is communicating with a regulator control valve.

In this technique, the regulator control valve is controlled such that the discharge flow rate from a hydraulic pump is increased as the working hydraulic pressure in the negative control passage (i.e., the negative control pressure) decreases. It is considered that this construction can minimize the discharge flow rate from the hydraulic pump by introducing a higher negative control pressure to the regulator control valve when a hydraulic N cylinder or hydraulic motor on the circuit is not being operated (i.e., the lever is in the neutral position in the absence of any operation) or the magnitude of an operation (manipulated variable), if any, is very small. Such controls on the discharge flow rate from the hydraulic pump by means of the differential pressure of the orifice on the center bypass are generally referred to as “negative controls”.

The choking characteristic of an orifice used for negative controls is set, based on the pump characteristic for the discharge flow rate from the hydraulic pump when the work machine is in normal operation, i.e., while the engine is rotating at the rated engine speed. For example, the pump characteristic is set such that the discharge flow rate Q is increased as the negative control pressure $P_n$ decreases and such that the discharge flow rate Q is reduced as the negative control pressure $P_n$ increases, as indicated in the solid line in FIG. 3.

In this example, the pump characteristic at the rated engine speed is set such that the discharge flow rate Q is set to a first flow rate $Q_1$ when the negative control pressure $P_n$ is a first pressure $P_1$ or greater, whereas the discharge flow rate Q is set to a second flow rate $Q_2$ ($Q_2>Q_1$) when the negative control pressure $P_n$ is smaller than a second pressure $P_2$. In addition, in the range in which the negative control pressure $P_n$ satisfies $P_2<=P_n<P_1$, the discharge flow rate Q is reduced in proportion to an increase in the negative control pressure $P_n$.

For such a pump characteristic, the choking characteristic of the orifice is set such that a negative control pressure that minimizes the discharge flow rate Q from the hydraulic pump is generated when the lever is in the neutral position. For example, as indicated in the broken line in FIG. 3, the choking characteristic of the orifice is set such that the negative control pressure $P_n$ (i.e., the upstream pressure of the orifice) becomes the first pressure $P_1$ or greater when the discharge flow rate Q is the first flow rate $Q_1$. The pressure $P_{n1}$ corresponding to the point of intersection A of the solid line and the broken line in FIG. 3 is the negative control pressure when the lever is in the neutral position, and the pump flow rate corresponding to this point of intersection is the first flow rate $Q_1$.

PRIOR ART REFERENCE

Patent Document

Patent Reference 1: Japanese Laid-open Patent Publication No. 2001-271806

DISCLOSURE OF THE INVENTION

Problem to be Solved by the Invention

However, the pump characteristic for such a discharge flow rate Q of the hydraulic pump cannot be applied to cases in which the actual engine speed is lower than the rated engine speed, since this pump characteristic is defined for the rated engine speed. More specifically, when the engine speed decreases, the pump discharge flow rate is reduced in proportion to the decreased in the engine speed. As a result, as indicated in the dot-dash line in FIG. 3, for example, the discharge flow rate Q decreases, in the entire range, for the same negative control pressures $P_n$.

Accordingly, the negative control pressure when the lever is in the neutral position is the pressure $P_{n2}$ corresponding to the point of intersection B, which is the point of intersection of the dot-dash line and the broken line FIG. 3, the pressure $P_{n2}$ being lower than the first pressure $P_1$.

In addition, if the minimum discharge flow rate $Q_3$ of the hydraulic pump at an engine speed below the rated engine speed is smaller than the flow rate $Q_s$ of the orifice at the first pressure $P_1$ (i.e., the flow rate corresponding to the point C), the pump flow rate $Q_r$ corresponding to the point of intersection B becomes greater than the minimum discharge flow rate $Q_3$. In other words, the extra hydraulic fluid of pump flow rate $Q_r$ exceeding the minimum discharge flow rate $Q_3$ is wastefully disposed to the hydraulic fluid tank, which deteriorates the efficiency. In such a case, since the hydraulic pump discharges the hydraulic fluid in an amount much greater than the minimum-required discharge flow rate $Q_3$, pressure loss occurs and the actual discharge pressure becomes lower than the expected discharge pressure.

As described above, conventional negative controls have a problem that the minimum pump discharge flow rate cannot be obtained when engine speed falls below the rated engine speed. This problem may deteriorate the fuel efficiency.

The present invention is conceived in view of the above problem, and it is an object thereof to provide a hydraulic control apparatus for a work machine that maintains the discharge flow rate from a hydraulic pump to the lowest flow rate when the lever is in the neutral position, irrespective of the engine speed, to reduce the output, thereby improving the fuel consumption.

Means to Solve the Problem

In order to achieve the above object, a hydraulic control apparatus for a work machine of the invention according to claim 1 is characterized in that the apparatus includes an engine that provides a driving source for the work machine; a hydraulic pump that is provided on an open center hydraulic circuit and is driven by the engine; a hydraulic actuator that is interposed on the hydraulic circuit and is operated responsive to a hydraulic fluid provided by the hydraulic pump; a negative control circuit that directs a hydraulic pressure in a center bypass in the hydraulic circuit to the hydraulic pump, as a negative control pressure; an idling detection device that detects whether the hydraulic actuator is a non-operated state or not; and a negative control pressure control device that controls the negative control pressure to an arbitrary value, wherein the hydraulic pump has a pump characteristic for minimizing a discharge flow rate of the hydraulic pump when the negative control pressure is equal to or greater than a first predetermined pressure, and the negative control pressure control device forcefully controls the negative control pressure to the first predetermined pressure or higher when the non-operating state of the hydraulic actuator is detected by the idling detection device.

In addition, a hydraulic control apparatus for a work machine of the present invention according to claim 2 is characterized in that, in addition to the structure according to claim 1, a pressure switch that outputs an ON or OFF signal in accordance with a presence or absence of an operational input to an operation lever related to the hydraulic actuator, wherein the idling detection device detects the non-operating state when the OFF signal is received from the pressure switch.

In addition, a hydraulic control apparatus for a work machine of the present invention according to claim 3 is characterized in that, in addition to the structure according to claim 2, the idling detection device detects the non-operating state when the OFF signal is continuously received from the pressure switch for a predetermined time period.

In other words, a non-operating state of the hydraulic actuator is detected when the idling detection device, i.e., an automatic deceleration function of the engine is activated.

In addition, a hydraulic control apparatus for a work machine of the invention according to claim 4 is characterized in that, in addition to the structure according to any one of claims 1-3, a hydraulic lock device that locks an operation of a control valve related to the hydraulic actuator, wherein the idling detection device detects the non-operating state when the hydraulic lock device is activated.

Effect of Invention

According to the hydraulic control apparatus for a work machine of the present invention (claim 1), since the minimum value of the negative control pressure is forcefully controlled to the first predetermined pressure or higher while the hydraulic actuator is in an non-operating state, a higher negative control pressure is maintained, irrespective of the engine speed, thereby maintaining the minimum discharge flow rate from the hydraulic pump. This can help to improve the fuel efficiency.

In addition, according to the hydraulic control apparatus for a work machine of the present invention (claim 2), the non-operating state can be reliably detected with a simplified structure, by checking presence or absence of any operational input to the operation lever.

In addition, according to the hydraulic control apparatus for a work machine of the present invention (claim 3), by adding a time constraint to a condition for determining the non-operating state, the control is prevented from being repeatedly performed in a short period of time, which can stabilize the control.

In addition, according to the hydraulic control apparatus for a work machine of the present invention (claim 4), the non-operating state can be detected more reliably by checking an operation of the hydraulic lock device. Furthermore, the non-operating state is determined only when an operator activates the hydraulic lock device, which helps to improve the feeling of operation.

DESCRIPTION OF EMBODIMENTS

Hereinafter, an embodiment of the prevent invention will be described with reference to the drawings.

1. Construction

Figure 1:
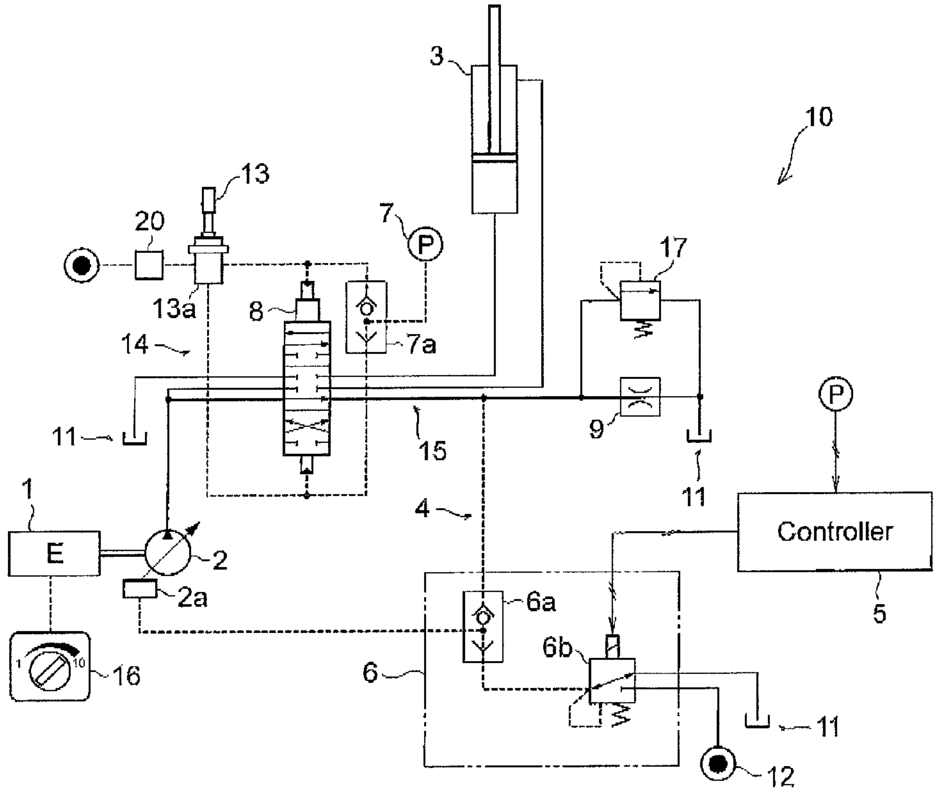
FIG. 1 illustrates a hydraulic circuit diagram schematically illustrating a hydraulic circuit to which a hydraulic control apparatus for a work machine is applied, according to an embodiment of the present invention.

The present invention is applied to an open center hydraulic circuit 10 of a hydraulic excavator, which is schematically illustrated in FIG. 1. This diagram illustrates a schematic construction of a hydraulic circuit for operating a hydraulic cylinder 3 for extending and retracting a front work machine.

A hydraulic pump 2 is driven by an engine 1 for discharging hydraulic fluid stored in a hydraulic fluid tank 11 to the hydraulic circuit 10. The hydraulic fluid is supplied from the hydraulic pump 2 to the hydraulic cylinder 3 via a control valve 8. Furthermore, the hydraulic pump 2 is provided with a regulator **2*a* for controlling the discharge flow rate of the hydraulic fluid from the hydraulic pump 2. The speed of the engine can be arbitrally set by an operator using an accelerator dial 16. For example, when the accelerator dial 16 is set to Position One, is the engine 1 is controlled such that the slowest engine speed (1000 rpm) is maintained. In addition, when the accelerator dial 16 is set to Position Ten, the engine 1 is controlled such that the fastest engine speed (2000 rpm) is maintained. In this manner, the engine speed is set in a stepwise manner in accordance with the position of the accelerator dial 16**.

Note that the output of this engine 1 (in a unit of horsepower) is increased as the number of the position of the accelerator dial 16 increases. Accordingly, the maximum position of the accelerator dial 16, that is Position Ten, provides the highest engine output. The output of the hydraulic pump 2 (in a unit of horsepower) is also set in accordance with the engine output.

The control valve 8 is configured as a control valve that variably controls the distribution direction and the flow rate of the hydraulic fluid by switching between the multiple positions of the spool (flow rate control stems). Furthermore, operational pilot lines 14 are connected to the respective ends of the spool of the control valve 8.

The operational pilot lines 14 are connected to a remote control valve 13 that opens or closes in accordance with the magnitude of the operation of an operation lever 13 for directing the pilot pressure corresponding to that magnitude of the operation to the spool. Here, two operational pilot lines 14 are provided for responding to operations of the operation lever 13 towards each of the two directions. Thus, if the operation lever 13 is operated to either of the two directions, the spool of the control valve 8 is vertically (vertically as illustrated in FIG. 1) shifted, which controls the flow rate of the hydraulic fluid to be supplied to the hydraulic cylinder 3 in accordance with the magnitude of the operation of the lever, for extending or retracting of the hydraulic cylinder 3.

In addition, a shuttle valve **7*a* is interposed between operational pilot lines 14, in parallel to the control valve 8. The shuttle valve 7***a* functions to select the one of the two operational pilot lines 14 having a higher pressure. The selected pilot pressure is introduced to a pressure switch 7.

The pressure switch 7 is a switch that outputs an ON signal only when a pilot pressure higher than the pressure in the neutral position of lever (when the lever is not being operated) is entered. Since the pressure introduced from the shuttle valve 7*a* is not dependent on the direction to which the is operation lever 13 is operated, the pressure switch 7 outputs an ON signal in response to any operational input to the operation lever 13. In contrast, the pressure switch 7 outputs an OFF signal when the operation lever 13 is in the neutral position. Such an ON or OFF signal is sent to a controller 5, which will be described later.

On a center bypass 15 that is a return path of the hydraulic fluid discharged by the hydraulic pump 2 when the operation lever 13 is in the neutral position, an orifice 9 and a negative control relief valve 17 are disposed in parallel to each other. In addition, a negative control circuit 4 is provided on a branch from the center bypass 15 on the upstream side of the orifice 9 and the negative control relief valve 17 (closer to the control valve 8).

The negative control circuit 4 is a circuit for negative controls on regulator 2*a* for the hydraulic pump 2. The term "negative controls" refers to controls for maintaining the output from the hydraulic pump 2 to substantially constant by decreasing or increasing the discharge flow rate of the hydraulic pump 2 in response to any increase or decrease in the working hydraulic pressure of the negative control circuit 4. As used herein, the working hydraulic pressure that is being introduced to the regulator 2*a* via the negative control circuit 4 is referred to as a "negative control pressure".

Both the orifice 9 and the negative control relief valve 17 are valves for generating a negative control pressure. The negative control relief valve 17 functions as a safety valve to confine the working hydraulic pressure in the center bypass 15 within a range of a preset upper limit or lower. The orifice 9 is a choke valve that limits the flow rate of the hydraulic fluid discharged from the center bypass 15 to the hydraulic fluid tank 11.

Figure 2:
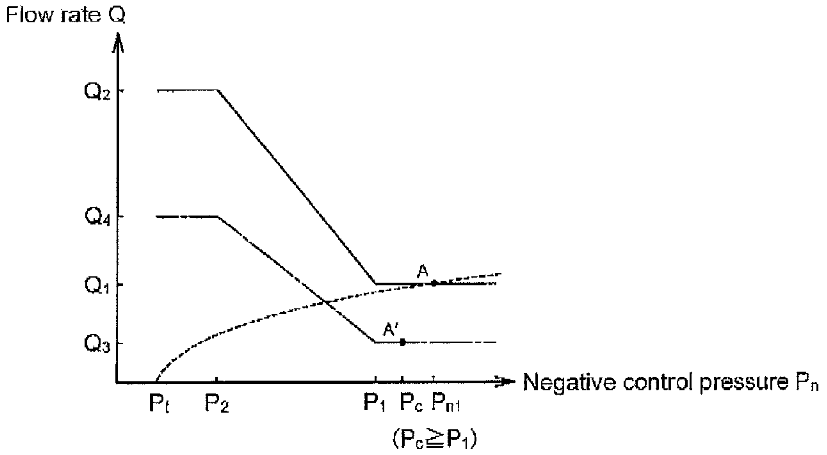
FIG. 2 illustrates graphs representing the to relationship between the discharge flow rate of a hydraulic pump and a negative control pressure in this hydraulic control apparatus.
Figure 3:
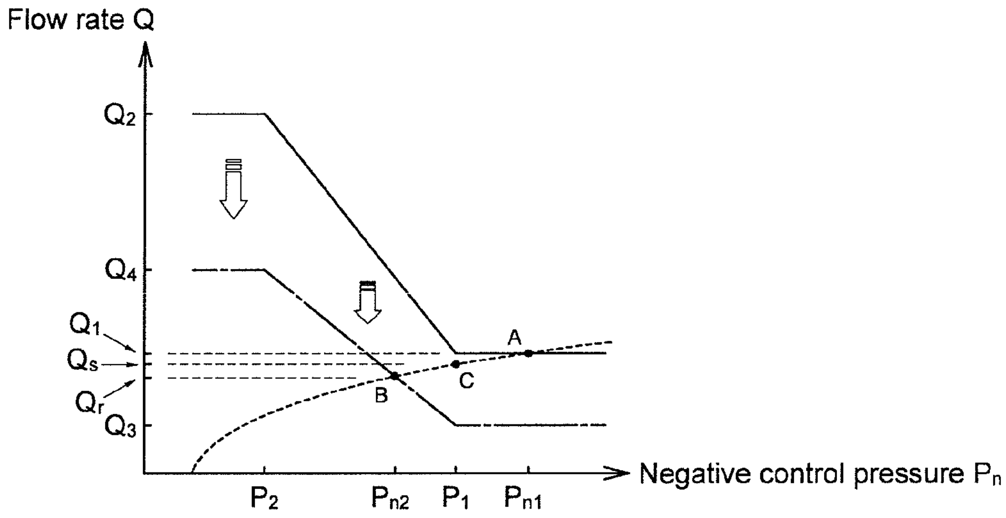
FIG. 3 illustrates graphs representing a conventional hydraulic control.

The negative control pressure $P_n$ generated by the orifice 9 and the negative control relief valve 17 is correlated with the flow rate Q of the hydraulic fluid of in the center bypass 15, as indicated in the broken line in FIG. 2, wherein the negative control pressure $P_n$ is increased as the flow rate Q increases. Note that the correlation between the negative control pressure $P_n$ and the flow rate Q is represented by the following Equation 1, with regard to the choking characteristic of the orifice 9:

[Equation 1]

$$P_n = \frac{\rho}{2C^2A^2}Q^2 + P_t \qquad \text{(Equation 1)}$$

(where ρ represents the density of the hydraulic fluid, C represents the flow rate coefficient, A represents the opening area, and $P_t$ represents the tank pressure)

The relationship between the negative control pressure $P_n$ to be introduced to the regulator 2*a* and the discharge flow rate from the hydraulic pump 2 controlled by this negative control pressure $P_n$ is superimposed in FIG. 2. Note that the discharge flow rate from the hydraulic pump equals the flow rate Q of the hydraulic fluid in the center bypass 15 when the operation lever 13 is in the neutral position. The following description will be given using "Q" as a symbol representing the discharge flow rate when the operation lever 13 is in the neutral position.

The solid line in FIG. 2 indicates the pump characteristic of the engine 1 at the rated engine speed, which is the pump characteristic when the accelerator dial 16 is set to Position Ten. The dot-dash line in FIG. 2 indicates the pump characteristic of the engine 1 when rotating at a speed slower than the rated engine speed, which is the pump characteristic when the accelerator dial 16 is set to Position One.

The pump characteristic when the accelerator dial 16 is set to Position Ten is set such that the discharge flow rate Q is set to a first flow rate $Q_1$ when the negative control pressure $P_n$ is a first pressure $P_1$ (first predetermined pressure) or greater, whereas the discharge flow rate Q is set to a second flow rate $Q_2$ ($Q_2>Q_1$) when the negative control pressure $P_n$ is smaller than a second pressure $P_2$. In addition, in the range in which the negative control pressure $P_n$ satisfies $P_1<=P_n<P_2$, the discharge flow rate Q is reduced in proportion to an increase in the negative control pressure $P_n$.

Furthermore, the pump characteristic when the accelerator dial 16 is set to Position One is such that the overall flow rate Q becomes smaller as compared with when the accelerator dial 16 is set to Position Ten. In general, the discharge flow rate $Q_r$ can be represented in the following Equation 2, where $Q_p$ is the discharge flow rate of the engine 1 at the rated engine speed and N is the actual engine speed of the engine 1:

[Equation 2]

$$Q_r = \frac{\text{(Actial Engine Speed } N)}{\text{(Rated Engine Speed)}} \cdot Q_p \qquad \text{(Equation 2)}$$

Therefore, the flow rate Q is reduced to half when the accelerator dial 16 is changed from Position Ten (rated engine speed of 2000 rpm) to Position One (1000 rpm).

The broken line in FIG. 2 indicating the choking characteristic of the orifice 9 as described above intersects with the graph of the pump characteristic of the engine 1 at the rated engine speed, in the range equal to or greater than the first pressure $P_1$. In other words, the choking characteristic of the orifice 9 is set such that a negative control pressure is generated for setting the flow rate of the hydraulic fluid from the hydraulic pump 2 to the first flow rate $Q_1$ when the lever is in the neutral position. Accordingly, the pressure $P_{n1}$ corresponding to the point of intersection A of the two graphs is the negative control pressure when the lever is in the neutral position and the flow rate corresponding to this point of intersection A is $Q_1$.

2. Control of Negative Control Pressure

An NFC (negative flow control) valve 6 is interposed on the negative control circuit 4. The NFC valve 6 functions as a negative control pressure control device to forcefully increase the negative control pressure $P_n$ in the non-activated state, and is configured to include a shuttle valve 6*a* for selecting a higher pressure and a solenoid proportional pressure reduction valve 6*b*. The solenoid proportional pressure reduction valve 6*b* is used to direct the hydraulic fluid supplied from a pilot pump 12 to the negative control circuit 4, and is opened or closed under the control of the controller 5.

Here, the ratio of valve opening of the solenoid proportional pressure reduction valve 6*b* is set such that the hydraulic pressure on the downstream side becomes a predetermined pressure $P_c$ ($P_c>=P_1$) when the solenoid proportional pressure reduction valve 6*b* is turned on (is excited). Thereby, the negative control pressure $P_n$ introduced to the regulator 2*a* is forcefully maintained to a predetermined pressure $P_c$, irrespective of the value of the actual upstream pressure of the orifice 9. In this embodiment, the predetermined pressure is set to be smaller than the pressure $P_{n1}$ corresponding to the point of intersection A in FIG. 2.

As illustrated in FIG. 1, the solenoid proportional pressure reduction valve 6*b* is also connected to the hydraulic fluid tank 11, of which secondary pressure (downstream pressure) is set to the lowest pressure (tank pressure) when the solenoid proportional pressure reduction valve 6*b* is turned off (is not excited).

The controller 5 (idling detection device) is an electronic control apparatus constructed by a microcomputer, and is provided as an LSI device having a well-known microprocessor, an ROM, an RAM, and the like, integrated on that LSI. The controller 5 has a function as a detection device which detects whether the hydraulic cylinder 3 is a non-operated state or not. More specifically, the controller 5 controls the solenoid proportional pressure reduction valve 6*b* to be excited when an OFF signal is entered from the pressure switch 7. On the other hand. The controller 5 controls the solenoid proportional pressure reduction valve 6*b* not to be excited when an ON signal is entered from the pressure switch 7.

3. Applications and Effects

When an operational input is made on the operation lever 13 in a hydraulic excavator having the accelerator dial 16 that is set to Position Ten, a pilot pressure is generated on the pilot line 14 in accordance with the magnitude of the operation, for controlling the control valve 8. The working hydraulic pressure of the center bypass 15 is reduced as the magnitude of the operation of the operation lever 13 is increased. On the other hand, since the controller 5 controls the solenoid proportional pressure reduction valve 6*b* not to be excited in this case, the working hydraulic pressure on the side of the center bypass 15 is selected at the shuttle valve 6*a*. As a result, the negative control pressure $P_n$ introduced to the regulator 2*a* via the negative control circuit 4 is reduced, thereby increasing the flow rate of the hydraulic fluid discharged from the hydraulic pump 2.

Subsequently, when there is no operational input to the operation lever 13, the negative control pressure $P_n$ as the upstream pressure of the orifice 9 becomes the pressure $P_{n1}$. On the other hands, the controller 5 controls the solenoid proportional pressure reduction valve 6*b* to be excited, thereby generating a predetermined pressure $P_c$ on the downstream side of the solenoid proportional pressure reduction valve 6*b*. In this case, since the working hydraulic pressure $P_{n1}$ on the side of the center bypass 15 is higher than the working hydraulic pressure $P_c$ on the side of the solenoid proportional pressure reduction valve 6*b* at the shuttle valve 6*a*, the working hydraulic pressure $P_{n1}$ on the side of the center bypass 15 is introduced to the regulator 2*a*.

Furthermore, when the accelerator dial 16 is changed from Position Ten to Position One, the flow rate of the hydraulic fluid Q in the center bypass 15 is reduced, which reduces the working hydraulic pressure on the side of the center bypass 15 at the shuttle valve 6*a*. In other words, the pressure decreases along the broken line in FIG. 2, which indicates the choking characteristic of the orifice 9. However, the predetermined pressure $P_c$ generated on the other side of the shuttle valve 6*a* prevents the pilot pressure $P_n$ introduced to the regulator 2*a* from dropping lower than the predetermined pressure $P_c$. More specifically, the relationship between the discharge flow rate Q from the hydraulic pump 2 and the pilot pressure $P_n$ introduced to the regulator 2*a* become the Point A' indicated in FIG. 2, which can minimize the discharge flow rate Q from the hydraulic pump 2.

As described above, according to this hydraulic control circuit, since the minimum value of the negative control pressure $P_n$ is forcefully controlled to the predetermined pressure $P_c$ in the absence of any operational input to the operation lever 13, a higher negative control pressure $P_n$ is maintained, irrespective of the engine speed, which can minimize the discharge flow rate Q from the hydraulic pump 2. This can help to reduce hydraulic energy loss during idle operation (when no operation is being made), thereby improving the efficiency of the energy consumption.

In addition, a neutral state of the operation lever 13 can be detected with a simplified structure, which can reliably detect non-operating state of the hydraulic cylinder 3.

4. Miscellaneous

Although an embodiment of the present invention has been described, the present invention is not limited to the embodiment described above and various modifications may be made without departing from the spirit of the present invention.

For example, while the trigger for the controller 5 to activate the solenoid proportional pressure reduction valve 6*b* is an OFF signal being entered from the pressure switch 7 in the above-described embodiment, another trigger may be used in addition to, or in place of OFF signals. Examples of such a trigger for initiating controls are listed below:

When an OFF signal is continuously entered for a predetermined time period, irrespective of operation of the accelerator dial When the hydraulic lock lever is turned off, irrespective of operation of the accelerator dial When the accelerator dial is lowered, and the neutral position of the operation lever 13 is detected When the accelerator dial operation is lowered, and an OFF signal is continuously entered for a predetermined time period When the accelerator dial is lowered, and the hydraulic lock lever is turned off As mentioned above, by adding a time constraint to conditions for determining that the hydraulic cylinder 3 is in a non-operating state, the control is prevented from being repeatedly performed in a short period of time, which can stabilize the control. Note that a non-operating state of the hydraulic actuator may be detected when an automatic deceleration function of the engine is activated.

In addition, a non-operating state can be detected more reliably by checking the operation state of a hydraulic lock lever (hydraulic lock device) for locking the spool of the control valve 8. In this case, the non-operating state is determined only when an operator activates the hydraulic lock device 20, which helps to improve the feeling of operation.

In addition, while the above-described embodiment has been described with reference to a hydraulically operated operation lever 13, the present invention can also be applied to electrically operated levers. If an electrically operated lever is used, the effects similar to those of the above-described embodiment can be achieved by entering a signal related to the magnitude of the operation output from the lever to the controller 5.

While the predetermined pressure $P_c$ is set to the range of $P_1 <= P_c <= P_{n1}$ in the above-described embodiment, as illustrated in FIG. 2, the effects similar to those of the above-described embodiment can be achieved as long as the predetermined pressure $P_c$ satisfies at least $P_1 <= P_c$.

INDUSTRIAL APPLICABILITY

The present invention is applicable to the manufacturing industries of a wide variety of work machines, such as hydraulic excavators, as well as bulldozer, wheel loaders, hydraulic cranes.

DESCRIPTION OF REFERENCE SYMBOLS

1 ENGINE
2 HYDRAULIC PUMP
**2*a*** REGULATOR
3 HYDRAULIC CYLINDER
4 NEGATIVE CONTROL CIRCUIT
5 CONTROLLER (IDLING DETECTION DEVICE)
6 NFC VALVE (NEGATIVE CONTROL PRESSURE CONTROL DEVICE)
**6*a*** SHUTTLE VALVE
**6*b*** SOLENOID PROPORTIONAL PRESSURE REDUCTION VALVE
7 PRESSURE SWITCH
**7*a*** SHUTTLE VALVE
8 CONTROL VALVE (CONTROL VALVE)
9 ORIFICE
10 HYDRAULIC CIRCUIT
11 HYDRAULIC FLUID TANK
12 PILOT PUMP
13 OPERATION LEVER
**13*a*** REMOTE CONTROL VALVE
14 OPERATIONAL PILOT LINE
15 CENTER BYPASS
16 ACCELERATOR DIAL
17 NEGATIVE CONTROL RELIEF VALVE

What is claimed is:

1. A hydraulic control apparatus for a work machine, comprising:

an engine that provides a driving source for the work machine;

an accelerator dial being set to one position of plural positions to set an engine speed in accordance with the position of the accelerator dial;

a hydraulic pump that is provided on an open center hydraulic circuit and is driven by the engine, the output of the hydraulic pump being set in accordance with the position of the accelerator dial, and the hydraulic pump having a pump characteristic for minimizing a discharge flow rate of the hydraulic pump in accordance with the position of the accelerator dial when the negative control pressure is equal to or greater than a first predetermined pressure;

a hydraulic actuator that is interposed on the hydraulic circuit and is operated responsive to a hydraulic fluid provided by the hydraulic pump;

a negative control circuit that directs a hydraulic pressure in a center bypass in the hydraulic circuit to the hydraulic pump, as a negative control pressure;

an orifice provided on the center bypass and having a choking characteristic wherein the negative control pressure decreases below the first predetermined pressure as the flow rate decreases;

an idling detection device that detects whether the hydraulic actuator is a non-operated state or not; and a negative control pressure control device that controls the negative control pressure to an arbitrary value, wherein the negative control pressure control device controls the negative control pressure by forcing it to the first predetermined pressure or higher irrespective of the position of the accelerator dial when the non-operating state of the hydraulic actuator is detected by the idling detection device.

2. The hydraulic control apparatus for a work machine according to claim 1, further comprising a pressure switch that outputs an ON or OFF signal in accordance with a presence or absence of an operational input to an operation lever related to the hydraulic actuator, wherein the idling detection device detects the non-operating state when the OFF signal is received from the pressure switch.

3. The hydraulic control apparatus for a work machine according to claim 2, wherein the idling detection device detects the non-operating state when the OFF signal is continuously received from the pressure switch for a predetermined time period.

4. The hydraulic control apparatus for a work machine according to claim 1, further comprising a hydraulic lock device that locks an operation of a control valve related to the hydraulic actuator, wherein the idling detection device detects the non-operating state when the hydraulic lock device is activated.

5. The hydraulic control apparatus for a work machine according to claim 2, further comprising a hydraulic lock device that locks an operation of a control valve related to the hydraulic actuator, wherein the idling detection device detects the non-operating state when the hydraulic lock device is activated.

6. The hydraulic control apparatus for a work machine according to claim 3, further comprising a hydraulic lock device that locks an operation of a control valve related to the hydraulic actuator, wherein the idling detection device detects the non-operating state when the hydraulic lock device is activated.

* * * * *

UNITED STATES PATENT AND TRADEMARK OFFICE
CERTIFICATE OF CORRECTION

PATENT NO. : 8,899,035 B2
APPLICATION NO. : 13/265750
DATED : December 2, 2014
INVENTOR(S) : Nishikawa et al.

It is certified that error appears in the above-identified patent and that said Letters Patent is hereby corrected as shown below:

In the Specification:

Column 1, line 30, delete “hydraulic N cylinder” and insert -- hydraulic cylinder --.

Column 4, line 7, delete “the to” and insert -- the --.

Column 4, line 33, delete “is the” and insert -- the --.

Column 5, line 8, delete “the is” and insert -- the --.

Signed and Sealed this
Twenty-fourth Day of November, 2015

Michelle K. Lee
*Director of the United States Patent and Trademark Office*